(12) United States Patent
Park et al.

(10) Patent No.: US 10,622,775 B2
(45) Date of Patent: Apr. 14, 2020

(54) POWER SUPPLY APPARATUS FOR FIELD WINDING MOTOR AND FIELD WINDING MOTOR INCLUDING THE SAME

(71) Applicant: MANDO Corporation, Pyeongtaek-si, Gyeonggi-do (KR)

(72) Inventors: Seung Young Park, Yongin-si (KR); Chung Seong Lee, Uiwang-si (KR); Hyun Ku, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 375 days.

(21) Appl. No.: 15/640,742

(22) Filed: Jul. 3, 2017

(65) Prior Publication Data

US 2018/0006419 A1    Jan. 4, 2018

(30) Foreign Application Priority Data

Jul. 4, 2016    (KR) .................. 10-2016-0084290
Aug. 2, 2016   (KR) .................. 10-2016-0098523

(51) Int. Cl.
*H01R 39/38*     (2006.01)
*H02K 5/14*      (2006.01)
*H01R 39/08*     (2006.01)
*H01R 39/26*     (2006.01)
*H01R 39/42*     (2006.01)
(Continued)

(52) U.S. Cl.
CPC .......... *H01R 39/381* (2013.01); *H01R 39/08* (2013.01); *H01R 39/26* (2013.01); *H01R 39/42* (2013.01); *H02K 5/141* (2013.01); *H02K 13/003* (2013.01); *H01R 2201/10* (2013.01); *H02K 5/15* (2013.01); *H02K 5/1732* (2013.01)

(58) Field of Classification Search
CPC ...... H01R 39/381; H01R 39/08; H01R 39/26; H01R 39/42; H02K 13/003
USPC .......................................... 310/240
See application file for complete search history.

(56) References Cited

U.S. PATENT DOCUMENTS 5,550,418 A  *  8/1996  Chung ................. H02K 5/141
                                                   310/239
6,914,362 B2 *  7/2005  Lungu ................. H02K 16/005
                                                   310/136
(Continued)

FOREIGN PATENT DOCUMENTS

DE           1 638 374         7/1971
DE    10 2004 061 896 A1       7/2006
(Continued)

OTHER PUBLICATIONS

German Office Action dated Mar. 13, 2018, issued in corresponding German Patent Application No. 10 2017 006 277.3.

*Primary Examiner* — Forrest M Phillips
(74) *Attorney, Agent, or Firm* — Hauptman Ham, LLP (57) ABSTRACT

A power supply apparatus for a field winding motor. A brush is disposed is a holder. An armature is connected to the brush and disposed in the holder. A slip ring is electrically connected to or disconnected from the brush. A support spring surrounds the brush between the slip ring and the armature. A coil is disposed outside of the holder so as to overlap the support spring and the armature. A first power terminal is connected to the brush and supplies a first driving current. A second power terminal is connected to the coil and supplying a second driving current.

14 Claims, 8 Drawing Sheets

(51) Int. Cl.
    *H02K 13/00*    (2006.01)
    *H02K 5/15*     (2006.01)
    *H02K 5/173*   (2006.01)

(56) References Cited

U.S. PATENT DOCUMENTS

| | | | |
|---|---|---|---|
| 8,894,418 B2 * | 11/2014 | Perkinson | H01R 13/08 |
| | | | 439/18 |
| 9,370,992 B2 * | 6/2016 | Holmes | B60K 6/485 |
| 9,444,209 B2 * | 9/2016 | Schroeder | H01R 39/383 |
| 2004/0119370 A1 * | 6/2004 | Tekawade | H01R 39/385 |
| | | | 310/239 |
| 2011/0163628 A1 * | 7/2011 | Quail | H01R 39/40 |
| | | | 310/240 |
| 2012/0169176 A1 * | 7/2012 | Toledo | H01R 39/42 |
| | | | 310/240 |

FOREIGN PATENT DOCUMENTS

| | | |
|---|---|---|
| DE | 10 2009 020 915 A1 | 12/2009 |
| GB | 556501 A | 10/1943 |
| JP | 54-173207 U1 | 5/1978 |
| JP | 2009-278752 A | 11/2009 |
| KR | 10-0357995 B1 | 10/2002 |
| KR | 10-2004-0023063 A | 3/2004 |

\* cited by examiner

POWER SUPPLY APPARATUS FOR FIELD WINDING MOTOR AND FIELD WINDING MOTOR INCLUDING THE SAME

CROSS-REFERENCE TO RELATED APPLICATION

This application claims priority to and the benefit of Korean Patent Application No. 10-2016-0098523, filed on Aug. 2, 2016, and No. 10-2016-0084290, filed on Jul. 4, 2016, the disclosure of which is incorporated herein by reference in its entirety.

BACKGROUND

Field

The present disclosure relates to a power supply apparatus for a field winding motor and a field winding motor including the same.

Description

A hybrid vehicle or an electric vehicle, prominent as an eco-friendly vehicle, is driven by an electric motor obtaining torque by using electrical energy.

More specifically, a general electric vehicle travels by using torque of an electric motor as power. A general hybrid vehicle travels in an electric vehicle (EV) mode using only torque of an electric motor as power or in a hybrid electric vehicle (HEV) mode using both torque of an engine and torque of an electric motor as power.

Development of a wound rotor synchronous motor (WRSM) has been actively conducted as an electric motor used as a power source of such an eco-friendly vehicle.

In an existing WRSM, since a current is supplied to a coil using a brush formed from carbon and a slip ring, mechanical abrasion occurs continuously. As a length of the brush becomes shorter due to the mechanical abrasion, pressure of a support spring pushing the brush may be changed, a contact resistance between the brush and the slip ring may be increased, and a current supply may be unstable.

In addition, in the existing WRSM, since the brush is pushed so as to come into contact with the slip ring by using the support spring, the brush and the slip ring cannot be rapidly separated in the event of failure, and thus, a current supply cannot be stopped. When the current supply is not stopped in the event of failure, a fire may break out and a power supply apparatus, as well as other components of a motor, may be damaged.

Furthermore, the brush maintains mechanical contact with an outer peripheral surface of the slip ring in order to supply a current to a coil, and thus, dust, such as a metal power, may be generated due to friction and abrasion of the brush.

When such dust is accumulated in a cover accommodating the brush, a connection between different electrical polarities of the brush and the slip ring may be generated, causing a failure of a power supply apparatus.

In addition, unlike a general electric motor, since an electric motor used in a hybrid vehicle controlled in an EV mode and a HEV mode has a function for assisting driving performance, securing precise current control and durability are important considerations.

Related Art Document

Patent Document 1: Korean Patent Application Publication No. 10-2004-0023063
Patent Document 2: Korean Patent No. 10-0357995

BRIEF SUMMARY

Various aspects of the present disclosure provide a power supply apparatus for a field winding motor, able to prevent an unstable current supply caused by abrasion of a brush and stop a current supply in the event of failure, and a field winding motor including the same.

In addition, various aspects of the present disclosure provide a power supply apparatus for a field winding motor, able to discharge dust externally from a holder accommodating a brush and a slip ring, prevent moisture and foreign objects from infiltrating into the holder from the outside, and control a position of the brush so as to reliably supply a current to a coil, and a field winding motor including the same.

According to an aspect, a power supply apparatus for a field winding motor may include: a brush disposed in a holder; an armature connected to the brush and disposed in the holder; a slip ring electrically connected to or disconnected from the brush; a support spring surrounding the brush between the slip ring and the armature; a coil disposed outside of the holder so as to overlap the support spring and the armature; a first power terminal connected to the brush and supplying a first driving current; and a second power terminal connected to the coil and supplying a second driving current.

The power supply apparatus may further include: a first power supply unit supplying the first driving current to the first power terminal; and a second power supply unit supplying the second driving current to the first power terminal.

The power supply apparatus may further include a power supply unit supplying the first driving current and the second driving current, wherein a current value of the second driving current is different from or the same as that of the first driving current.

The power supply unit may commonly supply a driving current to the first power terminal and the second power terminal.

The first power terminal may include a positive (+) terminal and a negative (−) terminal, may be connected to the brush through the holder and the armature, and may supply the first driving current to a coil of the field winding motor, the first driving current being a DC current.

The second power terminal may include a positive (+) terminal and a negative (−) terminal and may supply the second driving current to the coil, the driving current being a DC current.

When the second driving current is applied to the coil, a first axial force may be generated to move the armature toward the slip ring, and the brush and the slip ring may be electrically connected due to a movement of the armature.

Axial force between the brush and the slip ring may be controlled by controlling a magnitude of the second driving current applied to the coil.

A second axial force may be generated by the support spring to move the armature away from the slip ring, the first axial force may be greater than the second axial force, and when the second driving current is applied, the brush and the slip ring may be electrically connected.

A second axial force may be generated by the support spring to move the armature away from the slip ring, and when the supply of the second driving current is stopped, the brush and the slip ring may be separated and may be electrically disconnected by the second axial force.

An electrical connection or an electrical disconnection between the brush and the slip ring may be controlled by applying or cutting off the second driving current irrespective of applying or cutting off the first driving current.

According to another aspect, a power supply apparatus for a field winding motor may include: a brush disposed in a holder; an armature connected to the brush and disposed in the holder; a slip ring electrically connected to or disconnected from the brush; a first power terminal connected to the brush and supplying a first driving current; a second terminal connected to a coil and supplying a second driving current; a dust discharge part formed in one side surface of the holder; and a solenoid installed on one side of the holder and opening and closing the dust discharge part.

The solenoid may include an armature installed at one end of the brush and moved along an inside surface of the holder to open and close the dust discharge part; and a coil installed outside of the holder and moving the armature.

A second axial force may be generated by the support spring surrounding the brush between the slip ring and the armature such that the armature is moved away from the slip ring.

According to another aspect, a field winding motor may include: a motor housing; a rotation shaft formed in a center of the motor housing; a rotor installed in the motor housing so as to rotate on the rotation shaft; and the power supply apparatus installed perpendicular to an extension direction of the rotation shaft on one side of the motor housing.

According to the present disclosure, in the power supply apparatus for a field winding motor, even in the case in which the brush is abraded, the brush and the slip ring can be electrically connected by moving an armature toward the slip ring with a certain axial force, thereby reliably supplying a driving current to the coil of the motor irrespective of the abrasion of the brush.

In addition, according to the present disclosure, in the power supply apparatus for a field winding motor, the brush and the slip ring can be electrically disconnected by cutting off a second driving current applied to the coil in the event of failure, thereby stopping the supply of the current to the coil in the event of failure.

Furthermore, according to the present disclosure, in the power supply apparatus for a field winding motor, the armature can be linearly moved by a certain distance by the solenoid and the dust discharge part can be opened and closed by the linear movement of the armature, thereby preventing a failure of the power supply apparatus, caused by a connection between different electrical polarities of the brush and the slip ring, caused by infiltration of external foreign objects and dust.

In addition, according to the present disclosure, in the power supply apparatus for a field winding motor, the brush may be reliably separated from or closely contact the slip ring through a linear movement of the armature, thereby reliably supplying a current to the coil wound on the rotor to precisely control a current.

DETAILED DESCRIPTION

Hereinafter, reference will be made to the present disclosure in detail, embodiments of which are illustrated in the accompanying drawings and described below, so that a person having ordinary skill in the art to which the present disclosure relates could easily put the present disclosure into practice. It should be understood that the present disclosure is not limited to the following embodiments but various changes in forms may made. Throughout the drawings, the same reference numerals and symbols will be used to designate the same or like components, and specific portions will be omitted for the sake of brevity.

It will be further understood that the terms "comprise", "include", "have", etc. used in this specification, specify the presence of stated features, integers, steps, operations, elements, components, and/or combinations of them but do not preclude the presence or addition of one or more other features, integers, steps, operations, elements, components, and/or combinations thereof.

Figure 1:
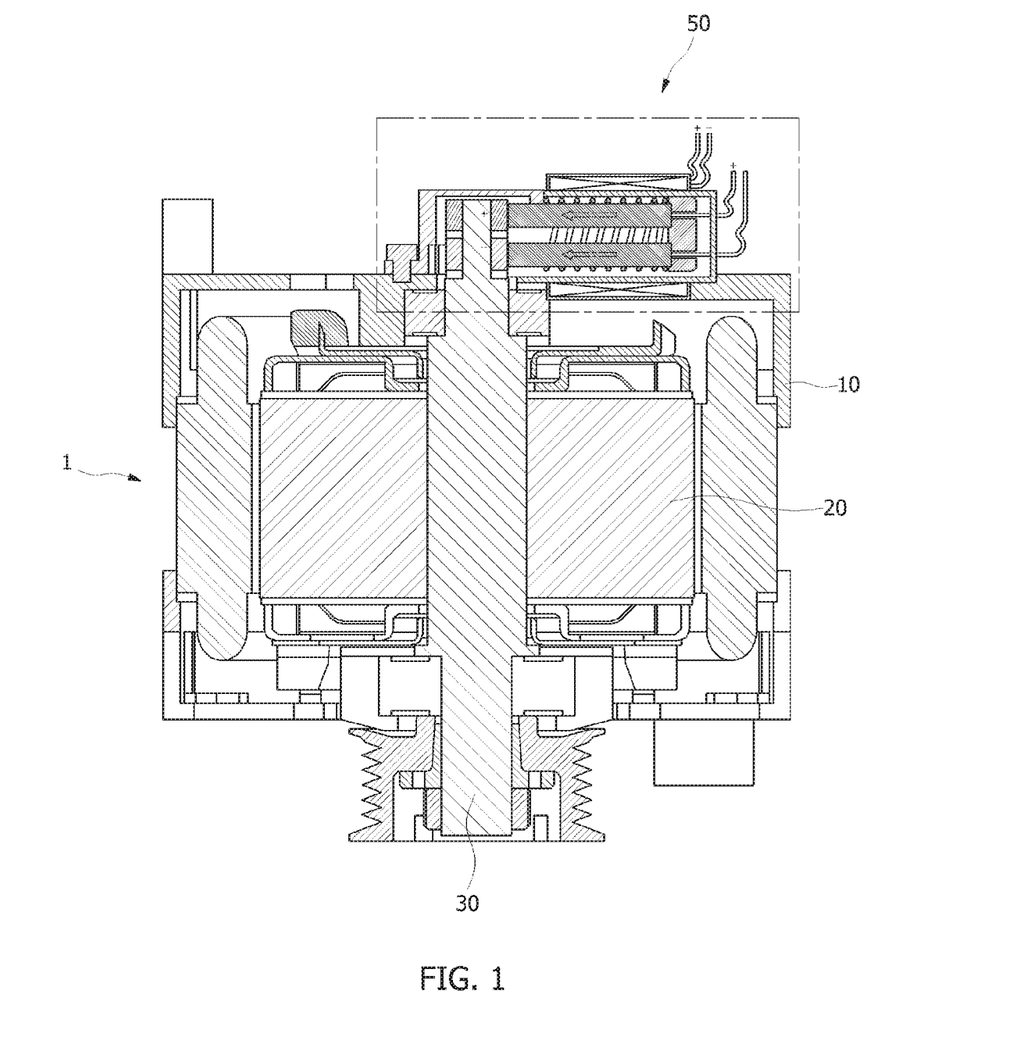
FIG. 1 is a cross-sectional view illustrating a field winding motor installed with a power supply apparatus for a field winding motor according to a first embodiment.
Figure 2:
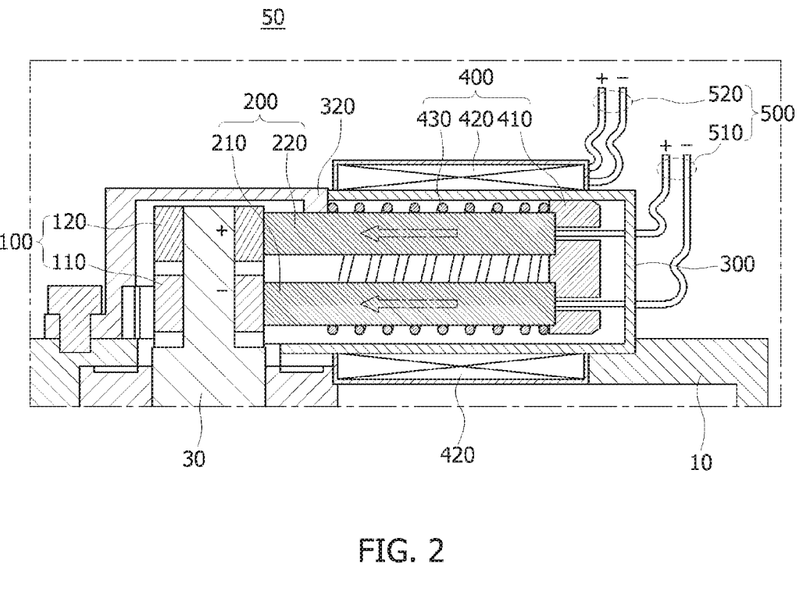
FIG. 2 is a view illustrating a state in which a current is applied to a coil from the power supply apparatus for the field winding motor according to the first embodiment.
Figure 3:
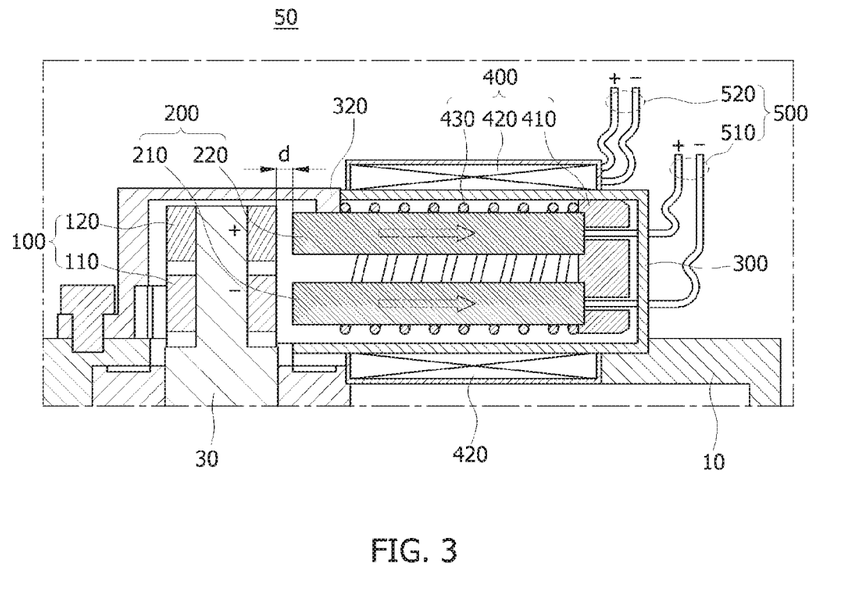
FIG. 3 is a view illustrating a state in which a current is not applied to the coil from the power supply apparatus for the winding motor shown in FIG. 2.

Referring to FIGS. 1 to 3, a field winding motor 1 including a power supply apparatus 50 for a field winding motor (hereinafter, referred to as a power supply apparatus) according to a first embodiment includes a motor housing 10, a rotor 20, a rotation shaft 30, and the power supply apparatus 50.

Hereinafter, descriptions assume that a direction from a brush 200 to a slip ring 100 is defined as a forward direction and a direction from the slip ring 100 to the brush 200 is defined as a rear direction when viewed in FIG. 1.

According an embodiment, the rotor 20 is installed in the motor housing 10 so as to rotate on the rotation shaft 30. At this time, the power supply apparatus 50 may be installed on an upper side of the motor housing 10.

Since the field winding motor 1 includes the power supply apparatus 50, the brush 200 and the slip ring 100 may be electrically connected by moving an armature 410 at a constant axial force in the forward direction even in the case in which the brush 200 is abraded. Accordingly, the field winding motor 1 may reliably supply a driving current to a coil of a motor irrespective of the abrasion of the brush 200.

Referring to FIGS. 1 and 2, the power supply apparatus 50 according to the first embodiment includes a holder 300, the brush 200, a support spring 430, the slip ring 100, the armature 410, a solenoid 400, and a power unit 500. At this time, the power supply apparatus 50 is an apparatus for generating magnetic flux in a rotor 20 by applying a current to coil wound on the rotor 20 through the brush 200 closely contacting the slip ring 100.

On the other hand, according to an embodiment, a hollow (not shown) is formed in the holder 300 such that the brush 200, the support spring 430, and the armature 410 are installed therein. A coil 420 may be installed outside of the holder 300.

In addition, the slip ring 100 is installed on the rotation shaft 30 of the field winding motor 1 and includes a pair of slip rings, i.e., a first slip ring 110 and a second slip ring 120 as a current transfer medium for applying a current to the coil wound on the rotor 20. The first slip ring 110 and the second slip ring 120 may be installed at one end of the rotation shaft 30, and more specifically, may be closely fixed to an outer peripheral surface of the rotation shaft 30 in a state of being spaced apart from each other in a lengthwise direction of the rotation shaft 30.

At this time, the first slip ring 110 and the second slip ring 120 may be connected to a positive pole (+) and a negative pole (−) of the coil wound on the rotor 20 and may be interlocked and rotated according to the rotation of the rotation shaft 30.

The brush 200 is fixed to the armature 410 and is moved toward the slip ring 100 or moved away from the slip ring 100 by a movement of the armature 410. That is, the brush 200 and the armature 410 may be coupled to each other, and the brush 200 may be moved by the movement of the armature 410.

At this time, the brush 200 may include a pair of brushes, i.e., a first brush 210 and a second brush 220. The first brush 210 and the second brush 220 may be disposed perpendicular to an extension direction of the rotation shaft 30 such that ends thereof respectively contact outer peripheral surfaces of the first slip ring 110 and the second slip ring 120.

In addition, the brush 200 and the slip ring 100 may be spaced apart from each other by a certain distance d. The brush 100 and the slip ring 200 may closely contact each other or may be separated from each other by the solenoid 400 described later, and thus, a current may be applied to the coil wound on the rotor 20 or an applied current may be cancelled.

On the other hand, the solenoid 400 includes the armature 410, the coil 420, and the support spring 430. At this time, the armature 410 may be installed at one end of the brush 200, more specifically, a rear end of the brush 200.

In addition, the coil 420 may be installed outside of the holder 300. The support spring 430 may be formed from a nonconductive material, may surround an external surface of the brush 100, and may be installed between the armature 410 and the slip ring 200.

More specifically, a support part 320 may protrude toward an inside of the holder 300 from an upper surface of the holder 300. Both ends of the support spring 430 may be supported by a side surface of the armature 410 and the support part 320, respectively.

On the other hand, the power unit 500 includes a first power terminal 510 and a second power terminal 520. All of the first power terminal 510 and the second power terminal 520 include a positive (+) terminal and a negative (−) terminal.

At this time, the first power terminal 510 is connected to the brush 200 through the holder 300 and the armature 410 and supplies a DC current, i.e., a first driving current for driving a motor, to a coil of motor. In addition, the second power terminal 520 supplies a DC current, i.e., a second driving current, to the coil 420.

Furthermore, according to an embodiment, a first power supply unit (not shown) may be provided so as to supply the first driving current to the first power terminal 510. A second power supply unit (not shown) may be provided so as to supply the second driving current to the second power terminal 520.

The coil 420 may be wound outside of the holder 300 so as to overlap the support spring 430 and the armature 410. The second driving current may be supplied to the coil 420 to move the armature 410 toward the slip ring 100.

At this time, the armature 410 is moved in the forward direction, for example, toward the slip ring 100 by electromagnetic force generated by the second driving current supplied to the coil 420. The brush 200 contacts the slip ring 100 by the movement of the armature 410.

Specifically, as a first axial force is generated by the second driving current supplied to the coil 420 and the armature 410 is moved in the forward direction, the brush 200 and the slip ring 100 are electrically connected.

As the brush 200 and the slip ring 100 contact each other, the first driving current supplied to the brush 200 is supplied to a coil of a motor through the slip ring 100. A north (N) pole and a south (S) pole may be generated by applying the first driving current to the coil wound on the rotor 20 of a motor, thereby adjusting electromotive force according to a magnitude of an applied current.

Here, the first axial force between the brush 200 and the slip ring 100 may be controlled by controlling the second driving current applied to the coil 420, thereby constantly maintaining resistance between the brush 200 and the slip ring 100 and reliably supplying the first driving current to the coil of the motor.

On the other hand, a second axial force is generated by the support spring 430 such that the armature 410 is moved away from the slip ring 100. However, since the first axial force generated by the second driving force is greater than the second axial force generated by the support spring 430, the brush 200 and the slip ring 100 are electrically connected when the second driving current is applied to the coil 420. That is, since first output is greater than second output, the brush 200 and the slip ring 100 are electrically connected.

Referring to FIG. 3, when the supply of the second current to the coil 420 is stopped, i.e. the second current is not applied to the coil 420, the armature 410 is moved away from the slip ring 100 by the second axial force generated by the support spring 430. Accordingly, the brush 200 and the slip ring 100 are spaced apart from each other and are electrically disconnected.

When system power is turned off, the support spring 430 may maintain the certain distance d between the brush 200 and the slip ring 100, thereby ensuring security in the event of failure caused by a locking phenomenon due to moisture infiltration.

In this case, even in the case in which the first driving current is supplied to the brush 200, the brush 200 and the slip ring 100 may be spaced apart from each other and may be electrically disconnected, thereby stopping a supply of a current to the coil of the motor in the event of failure.

That is, irrespective of applying or cutting off the first driving current, it is possible control an electrical connection and a disconnection between the brush 200 and the slip ring 200 and a current supply to the coil of the motor only through control of the second driving current.

In the aforementioned power supply apparatus 50 for the field winding motor according to the first embodiment, even in the case in which the brush 200 is abraded, the armature 410 may be moved toward the slip ring 100 with certain axial force, thereby electrically connecting the brush 200 and the slip ring 100. Therefore, irrespective of the abrasion of the brush 200, a driving current may be reliably supplied to the coil of the motor.

In addition, in the aforementioned power supply apparatus 50 for the field winding motor according to the first embodiment, the brush 200 and the slip ring 100 may be electrically disconnected by cutting off the second driving current applied to the coil 420 in the event of failure. Therefore, it is possible to stop the supply of the current to the coil of the motor in the event of failure.

Figure 4:
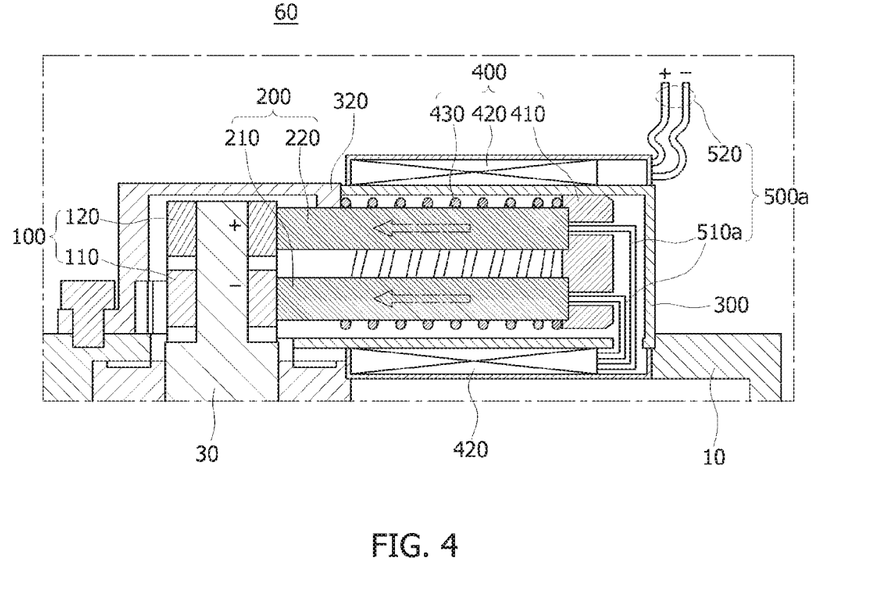
FIG. 4 is a view illustrating a state in which a current is applied to a coil from a power supply apparatus for a field winding motor according to a second embodiment.
Figure 5:
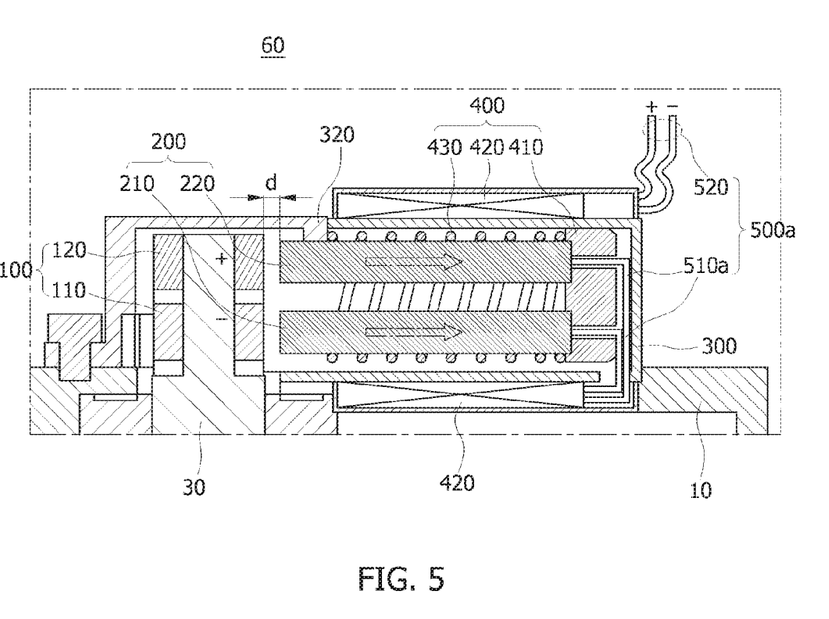
FIG. 5 is a view illustrating a state in which a current is not applied to the coil from the power supply apparatus for the field winding motor shown in FIG. 4.

Referring to FIGS. 4 and 5, a power supply apparatus 50 for a field winding motor according to a second embodiment includes a holder 300, a brush 200, a support spring 430, a slip ring 100, an armature 410, a solenoid 400, and a power unit 500a.

In the description of a configuration and driving of the power supply apparatus 60 according to the second embodiment, detailed descriptions of the same configuration and the same driving as in the first embodiment described above will be omitted.

The power with 500a according to the second embodiment includes a first power terminal 510a and a second power terminal 520. All of the first power terminal 510a and the second power terminal 520 may include a positive (+) terminal and a negative (−) terminal.

At this time, the first power terminal 510a is connected to the brush 200 through the armature 410 inside of the holder 300 and supplies, a DC current i.e., a first driving current for driving a motor, to a coil of the motor. In addition, the second power terminal 520 supplies a DC current, i.e., a second driving current, to a coil 420.

Furthermore, according to the second embodiment, one power supply unit (not shown) may be provided so as to respectively supply the first driving current and the second driving current to the first power terminal 510a and the second power terminal 520.

At this time, the power supply unit may generate the first driving current and the second driving current and may respectively supply the first driving current and the second driving current to the first power terminal 510a and the second power terminal 520.

However, the present disclosure is not limited thereto. The power supply unit may not distinguish the first driving current and the second driving current and may generate a single common driving current to commonly supply the generated single common driving current to the first power terminal 510a and the second power terminal 520

At this time, the power supply unit may generate the first driving current and the second driving current such that the first driving current and the second driving current have different current values or the same current value.

On the other hand, when the first driving current and the second driving current are generated as common driving currents having the same current value, the first power terminal 510a and the second power terminal 520 may be connected to each other and the second driving current (or the common driving current) supplied to the second power terminal 520 may be supplied to the coil 420.

As described above, one power supply unit may be provided to generate the first driving current and the second driving current (or the common driving currents), thereby reducing costs of a product.

As the second driving current (or the common driving current) is supplied to the coil 420 and a first axial force is generated to move the armature 410 toward the slip ring 100, the brush 200 and the slip ring 100 are electrically connected.

A second axial force is generated by the support spring 430 such that the armature 410 is moved away from the slip ring 100. However, since the first axial force generated by the second driving force (or the common driving current) is greater than the second axial force generated by the support spring 430, the brush 200 and the slip ring 100 are electrically connected when the second driving current (or the common driving current) is applied to the coil 420.

When the supply of the second current (or the common driving current applied to the coil 420 is stopped, i.e. the second current is not applied to the coil 420, the armature 410 is moved away from the slip ring 100 by the second axial force generated by the support spring 430. Accordingly, the brush 200 and the slip ring 100 are spaced apart from each other and are electrically disconnected.

When system power is turned off, the support spring 430 may maintain a certain distance between the brush 200 and the slip ring 100, thereby ensuring security in the event of failure caused by a locking phenomenon due to moisture infiltration.

In this case, the first driving current (or the common driving current) is also not supplied to the brush 200, and the brush 200 and the slip ring 100 are spaced apart from each other and are disconnected, thereby stopping a supply of a current to the coil of the motor in the event of failure.

In the aforementioned power supply apparatus 60 for the field winding motor according to the second embodiment, even in the case in which the brush 200 is abraded, the armature 410 may be moved toward the slip ring 100 with certain axial force, thereby electrically connecting the brush 200 and the ring 100. Therefore, irrespective of the abrasion of the brush 200, a driving current may be reliably supplied to the coil of the motor.

In addition, in the aforementioned power supply apparatus for the field winding motor according to the second embodiment, the brush 200 and the slip ring 100 may be electrically disconnected by concurrently cutting off the first driving current (or the common driving current) supplied to the coil and the second driving current applied to the coil 420 in the event of failure. Therefore, the failure and the damage of components provided in a motor may be prevented in the event of failure.

Figure 6:
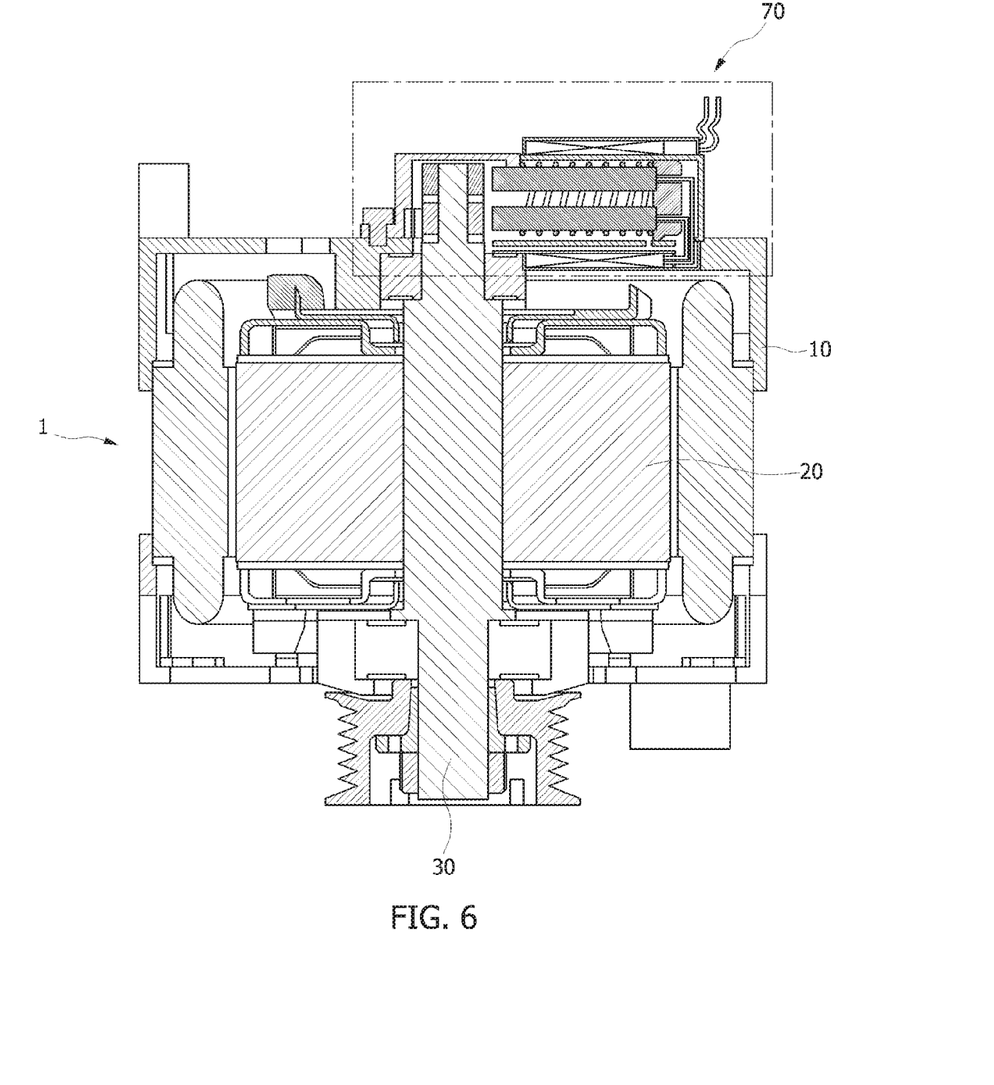
FIG. 6 is a cross-sectional view illustrating a field winding motor installed with a power supply apparatus for a field winding motor according to a third embodiment.
Figure 7:
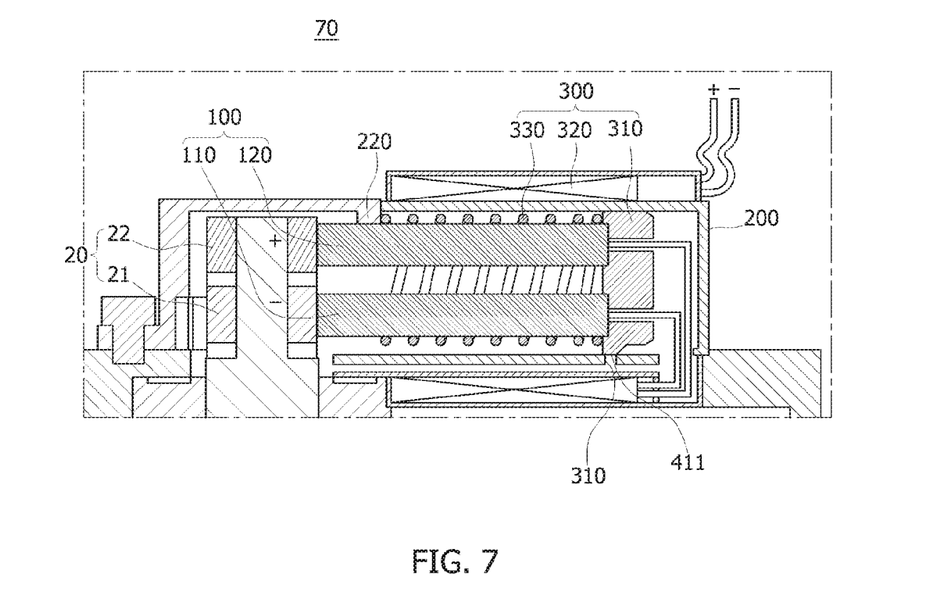
FIG. 7 is a view illustrating a state in which a current is applied to a coil from the power supply apparatus for the field winding motor according to the third embodiment.
Figure 8:
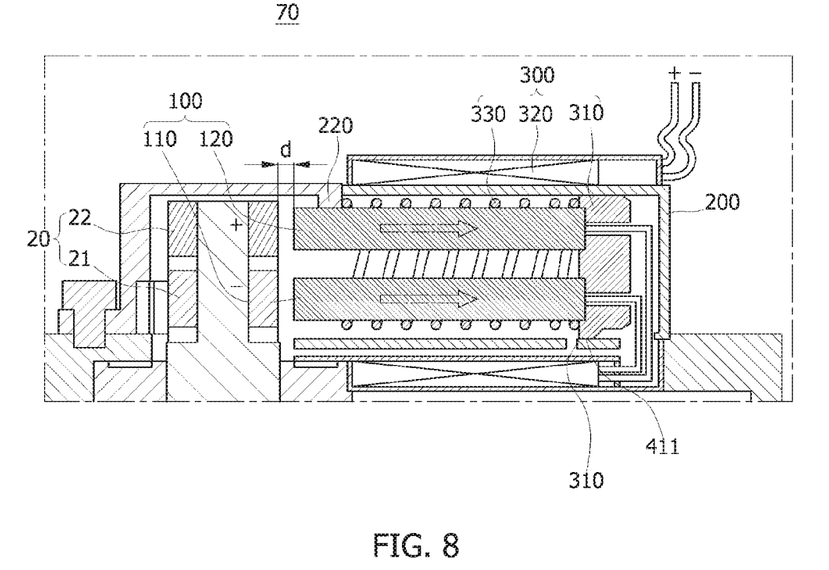
FIG. 8 is a view illustrating a state in which a current is not applied to the coil from the power supply apparatus for the winding motor shown in FIG. 7.

On the other hand, referring to FIGS. 6 to 8, a power supply apparatus 70 for a field winding motor is according to a third embodiment includes a holder 300, a brush 200, a support spring 430, a slip ring 100, an armature 410, a solenoid 400, a power unit 500a, a dust discharge part 310.

Therefore, in the power supply apparatus 70 for the field winding motor 1a according to the third embodiment, the armature 410 may be linearly moved by a certain distance by the solenoid 400 and the dust discharge part 310 may be opened and closed by the linear movement of the armature 410, thereby preventing a failure of the power supply apparatus generated by a connection between different electrical polarities of the brush 200 and the slip ring 100, caused by infiltration of external foreign objects and dust.

In the description of a configuration and driving of the power supply apparatus 70 according to the third embodiment, detailed descriptions of the same configuration and the same driving as in the first embodiment described above will be omitted.

On the other hand, a hollow (not shown) is formed in the holder 300 such that the brush 200, the support spring 430, and the armature 410 are installed therein. The dust discharge part 310 may be formed in a hole shape penetrating through one side surface of the holder 300. That is, based on a state in which a current is applied to the coil 420, the dust discharge part 310 may penetrate through one side surface of the holder 300, more specifically, a lower surface thereof, so as to correspond to an opening and closing part 411.

In addition, the opening and closing part 411 may be formed in the armature 410 to selectively open and close the dust discharge part 310. More specifically, the opening and closing part 411 may protrude outside from a lower portion of the armature 410 so as to closely contact an inside of the lower surface of the holder 300.

Referring to FIGS. 7 and 8, when a current is applied to the coil 420, the armature 410 is linearly moved along an inside surface of the holder 300 by generated magnetism, and the support spring 430 is compression-deformed by kinetic energy of the armature 410. In addition, when a current is not applied to the coil 420, the support spring 430 applies elastic force to the armature 410 and a support part 320, and thus, the brush 200 is spaced apart from the slip ring 100 by a certain distance d, and the dust discharge part 310 is maintained in a state of being opened from the opening and closing part 410.

At this time, as the brush 200 is moved by the certain distance d by the linear movement of the armature 410 to closely contact the slip ring 100, a current is applied to a coil wound on a rotor 20. In addition, the opening and closing part 411 is moved along the inside surface of the holder 300 by the certain distance d by which the brush 200 is moved, and closes the dust discharge part 310.

External moisture and foreign objects may be prevented from infiltrating into the holder 300 through the dust discharge part 310, thereby preventing a failure of the power supply apparatus 70, generated by a connection between different electrical polarities of the brush 200 and the slip ring 100, caused by the external foreign objects and dust.

At this time, in order to cancel a current applied to the coil wound on the rotor 20, the power supply apparatus 70 returns to a state shown in FIG. 8 by cancelling the current applied to the coil 420. That is, when the current applied to the coil 420 is cancelled, generated magnetism disappears, and the armature 410 and the opening and closing part 411 formed in the armature 410 return to an original position by a second axial force generated by the support spring 430.

As the armature 410 and the opening and closing part 411 return to the original position and the brush 200 is separated from the slip ring 100, the current applied to the coil wound on the rotor 20 is cancelled and the dust discharge part 310 closed by the opening and closing part 411 is opened.

Therefore, dust generated due to the abrasion of the brush 200 may be discharged externally from the holder 300 through the dust discharge part 310, thereby preventing a failure of the power supply apparatus 70, generated by a connection between different electrical polarities of the brush 200 and the slip ring 100, caused by the dust.

In addition, since the brush 200 is reliably separated from or closely contacts the slip ring 100 through the linear movement of the armature 410, a current may be reliably supplied to the coil wound on the rotor 20, thereby precisely controlling a current.

Although the specific embodiments of the present disclosure have been described for illustrative purposes, the scope of the present disclosure is by no means limited to the foregoing embodiments of the present disclosure. A person skilled in the art could easily make many other embodiments by adding, modifying, omitting, supplementing elements without departing from the principle of the present disclosure.

What is claimed is:

1. A power supply apparatus for a field winding motor, comprising:
   a brush disposed in a holder;
   an armature connected to the brush and disposed in the holder;
   a slip ring electrically connected to or disconnected from the brush;
   a support spring surrounding the brush between the slip ring and the armature;
   a coil disposed outside of the holder so as to overlap the support spring and the armature;
   a first power terminal connected to the brush and supplying a first driving current; and
   a second power terminal connected to the coil and supplying a second driving current,
   wherein an electrical connection or an electrical disconnection between the brush and the slip ring is controlled by applying or cutting off the second driving current irrespective of applying or cutting off the first driving current.

2. The power supply apparatus according to claim 1, further comprising:
   a first power supply unit supplying the first driving current to the first power terminal; and
   a second power supply unit supplying the second driving current to the first power terminal.

3. The power supply apparatus according to claim 1, further comprising a power supply unit supplying the first driving current and the second driving current,
   wherein a current value of the second driving current is different from or the same as that of the first driving current.

4. The power supply apparatus according to claim 3, wherein the power supply unit commonly supplies a driving current to the first power terminal and the second power terminal.

5. The power supply apparatus according to claim 1, wherein the first power terminal comprises a positive terminal and a negative terminal, is connected to the brush through the holder and the armature, and supplies the first driving current to a coil of the field winding motor, the first driving current being a direct current.

6. The power supply apparatus according to claim 1, wherein the second power terminal comprises a positive terminal and a negative terminal and supplies the second driving current to the coil, the second driving current being a direct current.

7. The power supply apparatus according to claim 1, wherein, when the second driving current is applied to the coil, a first axial force is generated to move the armature toward the slip ring, and
   the brush and the slip ring are electrically connected due to a movement of the armature.

8. The power supply apparatus according to claim 7, wherein the first axial force between the brush and the slip ring is controlled by controlling a magnitude of the second driving current applied to the coil.

9. The power supply apparatus according to claim 7, wherein a second axial force is generated by the support spring to move the armature away from the slip ring,
   the first axial force is greater than the second axial force, and when the second driving current is applied, the brush and the slip ring are electrically connected.

10. The power supply apparatus according to claim 7, wherein a second axial force is generated by the support spring to move the armature away from the slip ring, and when supply of the second driving current is stopped, the brush and the slip ring are separated and electrically disconnected by the second axial force.

11. A field winding motor comprising:
a motor housing;
a rotation shaft formed in a center of the motor housing;
a rotor installed in the motor housing so as to rotate on the rotation shaft; and
the power supply apparatus as claimed in claim 1 disposed perpendicular to an extension direction of the rotation shaft on one side of the motor housing.

12. A power supply apparatus for a field winding motor, comprising:
a brush disposed in a holder;
an armature connected to the brush and disposed in the holder;
a slip ring electrically connected to or disconnected from the brush;
a first power terminal connected to the brush and supplying a first driving current;
a second terminal connected to a coil and supplying a second driving current;
a dust discharge part formed in one side surface of the holder and spaced apart from the slip ring; and
a solenoid installed on one side of the holder and opening and closing the dust discharge part.

13. The power supply apparatus according to claim 12, wherein the solenoid comprises an armature installed at one end of the brush and moved along an inside surface of the holder to open and close the dust discharge part; and
a coil installed outside of the holder and moving the armature.

14. The power supply apparatus according to claim 13, wherein a second axial force is generated by the support spring surrounding the brush between the slip ring and the armature such that the armature is moved away from the slip ring.

* * * * *